US009220042B2

(12) United States Patent
Agarwal et al.

(10) Patent No.: US 9,220,042 B2
(45) Date of Patent: Dec. 22, 2015

(54) WIRELESS COMMUNICATION APPARATUS AND METHOD

(71) Applicants: Vineet K. Agarwal, Hyderabad (IN); Harishchandra Pendyala, Hyderabad (IN)

(72) Inventors: Vineet K. Agarwal, Hyderabad (IN); Harishchandra Pendyala, Hyderabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 284 days.

(21) Appl. No.: 13/925,831

(22) Filed: Jun. 25, 2013

(65) Prior Publication Data

US 2014/0376510 A1    Dec. 25, 2014

(51) Int. Cl.
*H04W 4/00*    (2009.01)
*H04W 36/02*    (2009.01)

(52) U.S. Cl.
CPC .................... *H04W 36/023* (2013.01)

(58) Field of Classification Search
CPC .................................................. H04W 72/042
USPC .......................................................... 370/329
See application file for complete search history.

(56) References Cited

U.S. PATENT DOCUMENTS

| | | | |
|---|---|---|---|
| 7,881,204 B2 | 2/2011 | Torsner | |
| 8,228,869 B2 | 7/2012 | Ahluwalia | |
| 2007/0291695 A1* | 12/2007 | Sammour | H04W 36/02 370/331 |
| 2008/0002594 A1* | 1/2008 | Forsberg et al. | 370/252 |
| 2009/0286541 A1 | 11/2009 | Maheshwari | |
| 2010/0002650 A1* | 1/2010 | Ahluwalia | H04L 1/1874 370/331 |
| 2010/0067483 A1 | 3/2010 | Ahluwalia | |
| 2012/0155432 A1 | 6/2012 | Ahluwalia | |
| 2012/0163342 A1 | 6/2012 | Ahluwalia | |
| 2012/0163343 A1 | 6/2012 | Ahluwalia | |
| 2014/0341013 A1* | 11/2014 | Kumar | H04L 47/50 370/229 |

\* cited by examiner

*Primary Examiner* — Brandon Renner
*Assistant Examiner* — Voster Preval
(74) *Attorney, Agent, or Firm* — Charles Bergere

(57) ABSTRACT

A transmission node in a wireless communication network includes a buffer, a transmitting section, a data processing section, a re-transmit queue, and a control section. To avoid duplication of SDUs for re-transmission, PDUs transformed from SDUs by the data processing section are maintained in the buffer by the control section after being transmitted to a mobile node in the network by the transmitting section. Addresses of the SDUs and associated sequence numbers are stored in the re-transmit queue. When handover of the mobile node from the transmission node to another transmission node occurs, PDUs of which the addresses are stored in the re-transmit queue are reverse transformed to SDUs with the associated sequence numbers so that the SDUs can be handed over to another transmission node.

15 Claims, 4 Drawing Sheets

WIRELESS COMMUNICATION APPARATUS AND METHOD

BACKGROUND OF THE INVENTION

The present invention relates to a wireless communication method and apparatus, and, more particularly, to a method for avoiding Packet Data Convergence Protocol (PDCP) downlink Service Data Unit (SDU) duplication in eNodeB under Radio Link Control acknowledged mode (RLC-AM).

FIG. 1 shows a wireless communication network 100 including a first cell 102 and a second cell 104, which are coverage areas of a first eNodeB 106 and a second eNodeB 108 respectively. An eNodeB (Evolved Node B) is the hardware that is connected to a mobile phone network that communicates directly with mobile handsets, like a base transceiver station. A user equipment (UE) 110 in the first cell 102 is receiving downlink information through a link 112 from the first eNodeB 106.

FIG. 2 is a diagram of a Layer-2 200 used in current wireless communication networks, for instance an LTE (Long Term Evolution) network. In a downlink transmission, Layer-2 200 is split into the following sublayers: Medium Access Control (MAC) sublayer 202, RLC (Radio Link Control) sublayer 204 and PDCP sublayer 206. A PDCP-RLC interface 208 connects the PDCP sublayer 206 to the RLC sublayer 204 for submitting data packets created in the PDCP sublayer 206 to the RLC sublayer 204 when the data packet is to be transmitted from the first eNodeB 106 to the UE 110. When the UE 110 is receiving downlink data from the eNodeB 106, e.g., streaming videos, downloading files, running games or surfing web pages online, Data Radio Bearers (DRBs) 210 created in the PDCP layer 206 for transfer of user data between the UE 110 and the first eNodeB 106 are RLC-AM mapped, which means every data packet transmitted from the eNodeB 106 to the UE 110 should be acknowledged with a signal through a link 114 to ensure lossless handover when the UE 110 is moving from the first cell 102 to the second cell 104. The first eNodeB 106 stores and transmits un-acknowledged data through the link 116 to the second eNodeB 108, therefore the second eNodeB 108 can continue to transmit un-acknowledged data over the link 118 to the UE 110 after the UE 110 enters the second cell 104.

In current eNodeBs, to ensure lossless handover, original PDCP DL SDUs are duplicated and listed in a re-transmission queue in the eNodeB with their addresses in a buffer. The duplicated SDUs are transformed to PDUs and the PDUs are transmitted to the UE. The original SDUs are maintained at their original addresses. When a handover occurs, the original SDUs listed in the re-transmission queue are sent to a target eNodeB.

The duplication of PDCP DL SDUs for re-transmission in case of handover uses alot of CPU cycles, which can cause a 20% performance drop when compared to the performance in unacknowledged mode (UM) where there is no SDU duplication. Further, the original SDUs are discarded either when they are acknowledged or when acknowledgement is not received within a predetermined time period. The cycles required for duplicating PDCP DL SDUs are mostly wasted because handover doesn't occur frequently when compared to DL data rate. It is therefore desirable to avoid PDCP DL SDU duplication in eNodeB under RLC-AM mode.

BRIEF DESCRIPTION OF THE DRAWINGS

The invention, together with objects and advantages thereof, may best be understood by reference to the following description of preferred embodiments together with the accompanying drawings in which:

FIG. 4B1 is a flowchart of a discard timer handling procedure in accordance with an embodiment of the invention;

FIG. 4B2 is a flowchart of an acknowledgement handling procedure in accordance with an embodiment of the invention.

DETAILED DESCRIPTION OF PREFERRED EMBODIMENTS

Figure 1:
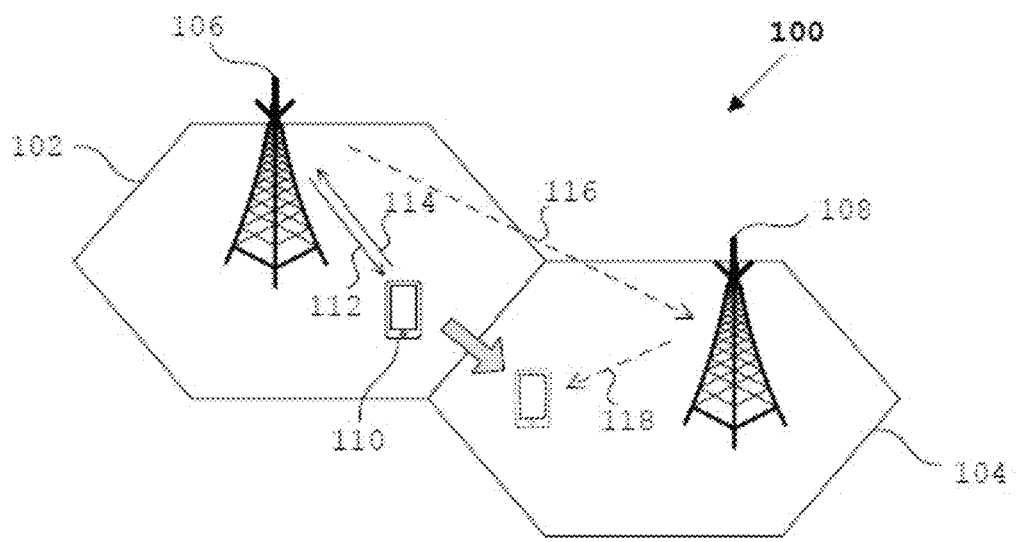
FIG. 1 shows a wireless communication network.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a transmission node in a wireless communication network. The transmission node includes: a buffer having a plurality of entries with corresponding addresses for storing data to be transmitted to another node in the network, wherein the data includes Service Data Unit (SDU) and Protocol Data Unit (PDU); a transmitting section connected to the buffer for transmitting the data to another node in the network; a data processing section connected to the buffer for transforming the data between an SDU and a PDU; a re-transmit queue for storing addresses of a plurality of SDUs stored in the buffer and associated sequence numbers assigned to the SDUs, wherein the SDUs require re-transmission; and a control section connected to the buffer, the re-transmit queue and the transmitting section for adding the address of the SDU and the associated sequence number assigned to the SDU to the re-transmit queue, and maintaining the PDU transformed from the SDU in the entry of the buffer after the PDU is transmitted to a mobile node. After a handover of the mobile node from the transmission node to a second transmission node occurs, the data processing section reverse transforms the PDU of which the address are stored in the retransmit queue back to the SDU with the associated sequence number stored in the retransmit queue, and the transmitting section transmits the reverse transformed SDU to the second transmission node.

In another embodiment, the present invention provides a method of operating a transmission node in a wireless communication network. The method includes: adding an address of an SDU stored in an entry of a buffer and an associated sequence number assigned to the SDU to a retransmit queue; transforming the SDU to a PDU; transmitting the PDU to a mobile node in the network and maintaining the PDU in the buffer; reverse transforming the PDU maintained in the buffer back to the SDU with the associated sequence number stored in the retransmit queue according to the addresses stored in the retransmit queue when a handover of a mobile node from the transmission node to a second transmission node occurs; and transmitting the reverse transformed SDU to the second transmission node.

Figure 3:
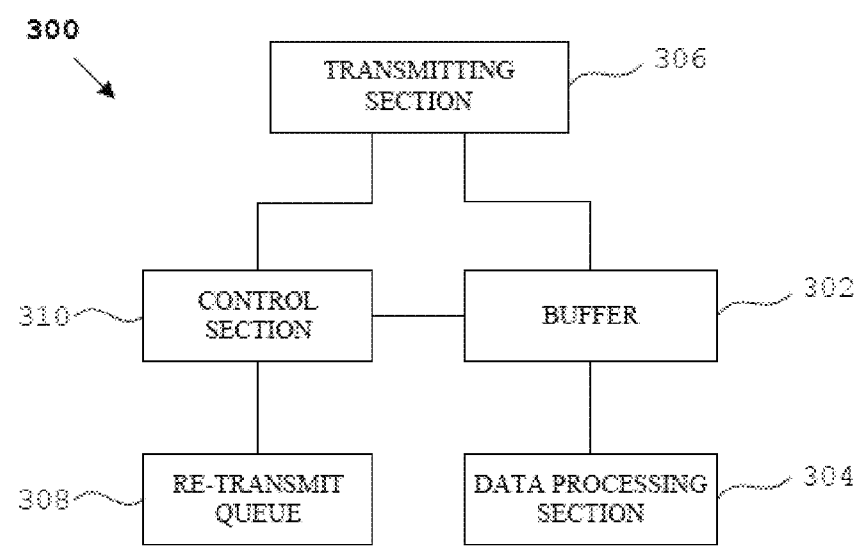
FIG. 3 is a schematic block diagram of an internal structure of a transmission node in accordance with an embodiment of the invention.

Referring now to FIG. 3, an internal structure of a transmission node 300 in a wireless communication network in accordance with an embodiment of the invention is shown. The transmission node 300 may be the eNodeB 106 or a relay node (not shown), which transmits downlink data to a mobile node in an area covered by the transmission node 300, for instance, the cell 102 covered by the eNodeB 106. The mobile node may be the UE 110, or a mobile relay node (not shown), as is known in the art.

The transmission node 300 has a buffer 302, a data processing section 304 connected to the buffer 302, a transmitting section 306 connected to the buffer 302, a re-transmit queue 308, and a control section 310 connected to the buffer 302, the re-transmit queue 308 and the transmitting section 306.

The buffer 302 comprises a memory having a plurality of entries with corresponding addresses. The buffer 302 stores SDUs or PDUs that are to be transmitted to another node in the network. The memory can be a RAM or part of an internal memory (RAM) of a micro control unit (MCU) of the transmission node 300.

The data processing section 304 transforms an SDU to a PDU when the SDU is to be transmitted to the mobile node, or reverse transforms a PDU to an SDU when necessary. Transforming the SDU to the PDU comprises ciphering or encoding the SDU and adding a PDCP header to the SDU. The data processing section 304 preferably comprises a processor of an MCU of the transmission node 300, or alternatively could comprise a separate processor within the transmission node 300.

The transmitting section 306 transmits the PDUs to the mobile node in the area covered by the transmission node 300, or transmits SDUs to a second transmission node, e.g., the second eNodeB 108 in the network 100. In a preferred embodiment, transmitting the PDU to the UE 110 by the transmitting section 306 includes submitting the PDU from the PDCP sublayer 206 to the RLC sublayer 204 through the PDCP-RLC interface 208. In RLC-AM mode, each PDU transmitted to the UE 110 requires acknowledgement from the UE 110.

The re-transmit queue 308 stores addresses of a plurality of SDUs in the buffer 302 and associated sequence numbers assigned to the SDUs in which corresponding PDUs transformed from the SDUs have not been acknowledged by the UE 110 yet and thus may require re-transmission. The re-transmit queue 308 preferably is located in a RAM of the MCU of the transmission node 300 or alternatively, in a separate RAM connected to the MCU in the transmission node 300.

Before transforming the SDU to the PDU, the control section 310 adds the address of the SDU and the associated sequence number assigned to the SDU to the re-transmit queue 308. After the PDU is transmitted to the UE 110, the control section 310 maintains the PDU at the address of the original SDU in the buffer 302.

In a preferred embodiment of the present invention, the control section 310 removes the address of the SDU and the associated sequence number assigned to the SDU from the retransmit queue 308, and releases the entry with the address when the PDU transmitted from the transmission node 300 to the UE 110 is acknowledged within a predefined period, or after the predefined period has expired without receiving an acknowledgement of the PDU.

When a handover of the UE 110 from the transmission node 300, i.e. the first eNodeB 106, to the second transmission node, i.e. the second eNodeB 108 occurs, the data processing section 304 reverse transforms the PDU of which the address are stored in the retransmit queue 308 to the SDU with the associated sequence number stored in the retransmit queue, and the transmitting section 306 transmits the reverse transformed SDU to the second transmission node. In a preferred embodiment, the SDU is transmitted to the second eNodeB 108 over an X2 interface. An X2 interface connects neighboring eNodeBs of an LTE Radio Access Network in a peer to peer fashion. The X2 interface is known by those of skill in the art.

Reverse transforming the PDU to the SDU with the associated sequence number stored in the retransmit queue 308 comprises: deciphering the PDU with a plurality of references of the PDU, and removing PDCP header from the PDU. The plurality of references of the PDU includes the associated sequence number stored in the retransmit queue. The associated sequence number includes information of Hyper Frame Number (HFN). In addition, the plurality of references of the PDU further includes a KEY, a ciphering algorithm, and a Bearer ID, wherein the KEY, the ciphering algorithm. The Bearer ID can be derived from a PDCP context stored in the memory of the transmission node 300.

In a preferred embodiment, the control section 310 removes the address of the SDU and the associated sequence number assigned to the SDU from the retransmit queue 308, and releases the entry with the address after transmitting the SDU to the second eNodeB 108.

Therefore, by maintaining the unacknowledged PDU in the buffer and reverse transforming the PDU to the SDU when re-transmission is required, in the first eNodeB 106, duplication of SDUs for re-transmission in case of handover is avoided and redundant CPU cycles for duplicating SDUs are saved.

Figure 4A:
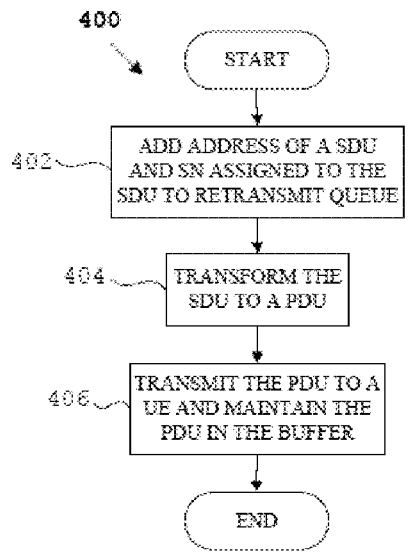
FIG. 4A is a flowchart of a downlink processing procedure in accordance with an embodiment of the invention.
Figure 4C:
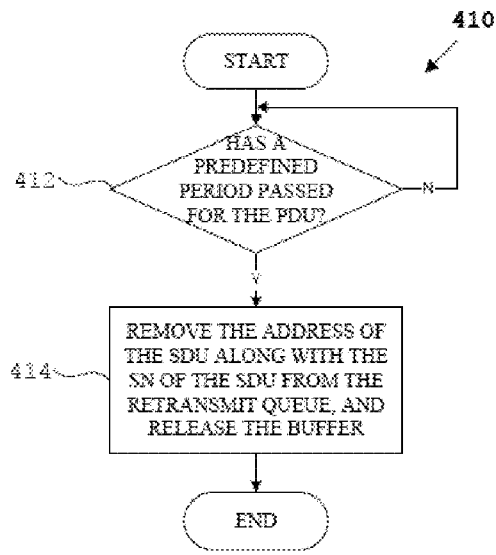
FIG. 4C is a flowchart of a handover processing procedure in accordance with an embodiment of the invention.
Figure 4C:
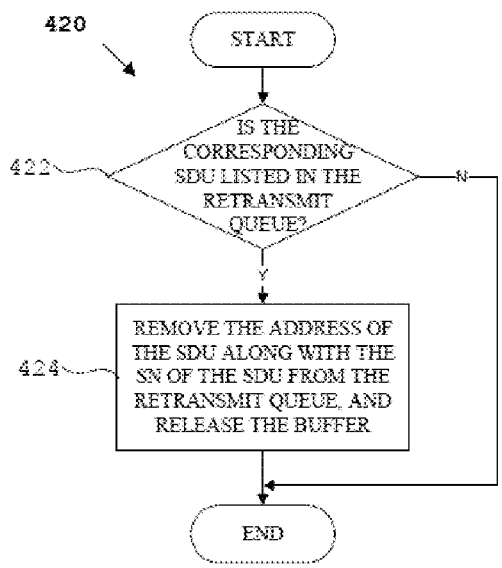
Figure 4C:
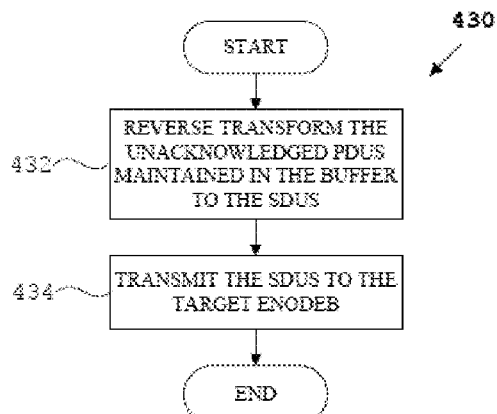

FIGS. 4A-4C are a series of flowcharts showing the steps of a method for avoiding PDCP downlink SDU duplication in eNodeB under RLC-AM mode.

FIG. 4A is a flowchart of a downlink processing part 400 in accordance with an embodiment of the invention.

At step 402, when an SDU is to be transmitted from the first eNodeB 106 to the UE 110, an address of the SDU stored in an entry of the buffer 302 of the first eNodeB and an associated sequence number assigned to the SDU are added to the re-transmit queue 308 of the first eNodeB 106.

At step 404, the SDU is transformed to a PDU. Transforming the SDU to the PDU comprises ciphering the SDU and adding PDCP header to the SDU.

At step 406, the PDU is transmitted to the UE 110, and the PDU is maintained in the buffer. In a preferred embodiment, transmitting the PDU to the UE 110 in the network and maintaining the PDU in the buffer comprises: submitting the PDU from PDCP sublayer 206 to RLC sublayer 204 through the PDCP-RLC interface 208; and issuing a command of not releasing the entry storing the PDU to maintain the PDU in the buffer. In a further preferred embodiment, the command is issued to the PDCP-RLC interface 208 along with submitting the PDU from PDCP sublayer 206 to RLC sublayer 204.

FIG. 4B1 is a flowchart of a discard timer handling part 410 in accordance with an embodiment of the invention. If the PDU transmitted from the first eNodeB 106 to the UE 110 has not been acknowledged, starting at step 412, the first eNodeB 106 checks whether a predefined period has passed, if yes, moving to step 414, the address of the SDU along with the sequence number assigned to the SDU are removed from the retransmit queue, and the entry storing the PDU is released, otherwise the timer continues.

Figure 2:
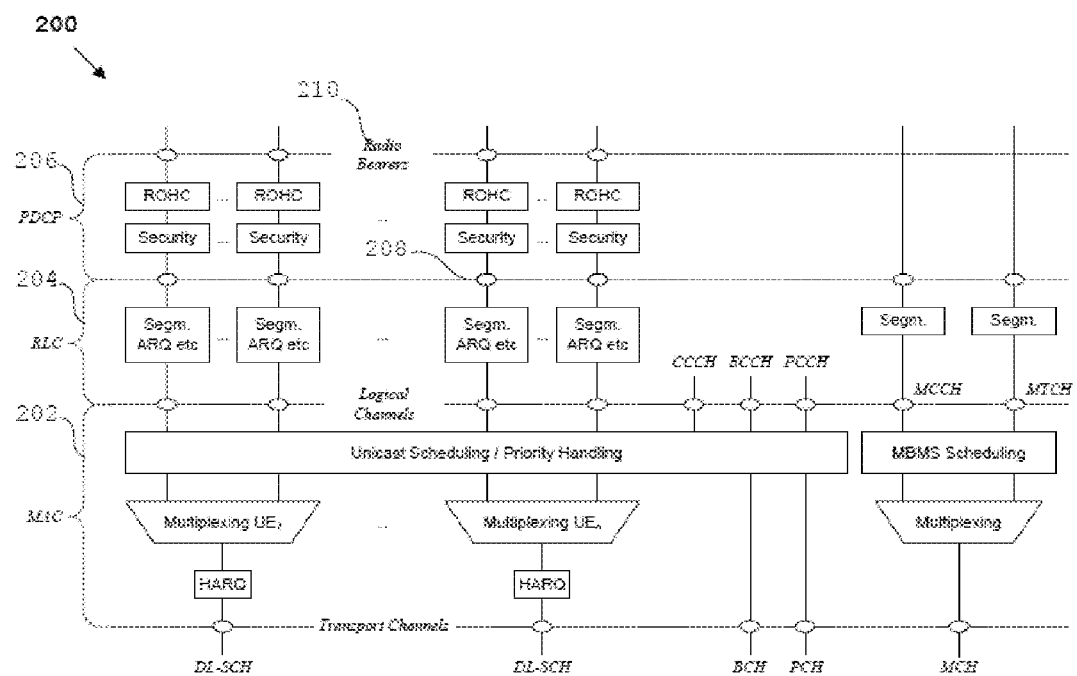
FIG. 2 is a schematic block diagram of a Layer 2 structure for downlink in an LTE network.

FIG. 4B2 is a flowchart of an acknowledgement handling part 420 in accordance with an embodiment of the invention. When the PDU transmitted from the first eNodeB 106 to the UE 110 is acknowledged, starting from step 422, the first eNodeB 106 checks whether the address of the corresponding SDU is stored in the retransmit queue. If the address of the corresponding SDU is still in the retransmit queue, moving to step 424, the address of the SDU along with the sequence number assigned to the SDU are removed from the retransmit queue, and the entry storing the PDU is released. Otherwise, if the address of the corresponding SDU has already been removed from the retransmit queue by another procedure, e.g., the PDU is acknowledged after the predefined period has passed, the SDU is discard and the address of the corresponding SDU is no longer in the retransmit queue, the acknowledgement handling part 420 of the PDU ends.

FIG. 4C is a flowchart of a handover processing part 430 in accordance with an embodiment of the invention.

At step 432, when a handover of the UE 110 from the transmission node 300, e.g. the first eNodeB 106, to the second transmission node, e.g. the second eNodeB 108 occurs, according to the address of the PDU stored in the re-transmit queue, the PDU maintained in the buffer, which has not been acknowledged by the UE 110 and requires re-transmission, is found and reverse transformed back to the SDU. In a preferred embodiment, reverse transforming the PDU back to the SDU with the associated sequence number stored in the retransmit queue includes deciphering the PDU with a plurality of references of the PDU, and removing PDCP header from the PDU. The plurality of references of the PDU includes the associated sequence number stored in the retransmit queue. The associated sequence number includes information of Hyper Frame Number (HFN). In addition, the plurality of references of the PDU further includes a KEY, a ciphering algorithm, and a Bearer ID, wherein the KEY, the ciphering algorithm. The Bearer ID can be derived from a PDCP context stored in the memory of the transmission node 300.

At step 434, the SDU is transmitted from the first eNodeB 106 to the second eNodeB 108 preferably over X2 interface.

Therefore, by maintaining the unacknowledged PDU in the buffer and reverse transforming the PDU to the SDU when re-transmission is required, in the first eNodeB 106, duplication of SDUs for re-transmission in case of handover is avoided and redundant CPU cycles for duplicating SDUs are saved.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A transmission node in a wireless communication network, comprising:
   a buffer having a plurality of entries with corresponding addresses for storing data to be transmitted to another node in the network, wherein the data includes a Service Data Unit (SDU) and a Protocol Data Unit (PDU);
   a transmitting section connected to the buffer for transmitting the data to the other node in the network;
   a data processing section connected to the buffer for transforming the data between a SDU and a PDU;
   a re-transmit queue for storing addresses of a plurality of SDUs stored in the buffer and associated sequence numbers assigned to the SDUs, wherein the SDUs require re-transmission; and
   a control section connected to the buffer, the re-transmit queue and the transmitting section for adding the address of the SDU and the associated sequence number assigned to the SDU to the re-transmit queue, and maintaining the PDU transformed from the SDU in the entry of the buffer after the PDU is transmitted to a mobile node,
   wherein after a handover of the mobile node from the transmission node to the other transmission node occurs, the data processing section reverse transforms the PDU of which the address are stored in the retransmit queue back to the SDU with the associated sequence number stored in the retransmit queue, and the transmitting section transmits the reverse transformed SDU to the second transmission node, and
   wherein the control section removes the address of the SDU and the associated sequence number assigned to the SDU from the retransmit queue, and releases the entry with the address when the PDU transmitted from the transmission node to the mobile node is acknowledged within a predefined period, or the predefined period has expired without receiving an acknowledgement of the PDU.

2. The transmission node of claim 1, wherein transforming the SDU to the PDU by the data processing section comprises encoding the SDU, and adding a PDCP header to the SDU.

3. The transmission node of claim 1, wherein transmitting the PDU to the mobile node by the transmitting section comprises submitting the PDU from a PDCP sublayer to a RLC sublayer through a PDCP-RLC interface connecting the PDCP sublayer and the RLC sublayer.

4. The transmission node of claim 1, wherein reverse transforming the PDU to the SDU with the associated sequence number stored in the retransmit queue comprises decoding the PDU with a plurality of references of the PDU, and removing a PDCP header from the PDU.

5. The transmission node of claim 4, wherein the plurality of references of the PDU includes the associated sequence number stored in the retransmit queue.

6. The transmission node of claim 5, wherein the plurality of references of the PDU further includes a KEY, a ciphering algorithm, and a Bearer ID, wherein the KEY, the ciphering algorithm, and the Bearer ID are derived from a PDCP context stored in the transmission node.

7. The transmission node of claim 1, wherein the reverse transformed SDU is transmitted to the second transmission node by the transmitting section over an X2 interface.

8. A method of operating a transmission node in a wireless communication network, comprising:
   adding an address of an SDU stored in an entry of a buffer and an associated sequence number assigned to the SDU to a retransmit queue;
   transforming the SDU to a PDU;

transmitting the PDU to a mobile node in the network and maintaining the PDU in the buffer;

reverse transforming the PDU maintained in the buffer back to the SDU with the associated sequence number stored in the retransmit queue according to the address stored in the retransmit queue when a handover of the mobile node from the transmission node to a second transmission node occurs; and transmitting the reverse transformed SDU to the second transmission node, wherein, prior to the reverse transforming step, removing the address of the SDU and the associated sequence number assigned to the SDU from the retransmit queue, and releasing the PDU entry in the buffer when the PDU transmitted from the transmission node to the mobile node is acknowledged within a predefined period, or the predefined period has expired without receiving an acknowledgement of the PDU.

9. The method of claim 8, wherein the step of transforming the SDU to the PDU comprises encoding the SDU and adding a PDCP header to the SDU.

10. The method of claim 8, wherein the step of transmitting the PDU to the mobile node and maintaining the PDU in the buffer comprises:

submitting the PDU from a PDCP sublayer to a RLC sublayer through a PDCP-RLC interface connecting the PDCP sublayer and the RLC sublayer; and issuing a command to not release the entry storing the PDU to maintain the PDU in the buffer.

11. The method of claim 10, wherein the command is issued to the PDCP-RLC interface along with submitting the PDU from the PDCP sublayer to the RLC sublayer.

12. The method of claim 8, wherein the step of reverse transforming the PDU back to the SDU with the associated sequence number stored in the retransmit queue comprises deciphering the PDU with a plurality of references of the PDU, and removing a PDCP header from the PDU.

13. The method of claim 12, wherein the plurality of references of the PDU includes the associated sequence number stored in the retransmit queue.

14. The method of claim 12, wherein the plurality of references of the PDU further includes a KEY, a ciphering algorithm, and a Bearer ID, wherein the KEY, the ciphering algorithm, and the Bearer ID are derived from a PDCP context stored in the transmission node.

15. The method of claim 8, wherein the SDU is transmitted to the second transmission node over an X2 interface.

* * * * *